US005826217A

United States Patent [19]

Lerner

[11] Patent Number: 5,826,217

[45] Date of Patent: Oct. 20, 1998

[54] PROGRAMMABLE MEDICINE DISPENSER AND STORAGE DEVICE

[76] Inventor: Sam Lerner, 575 Kent Ave., Brooklyn, N.Y. 11211

[21] Appl. No.: 812,340

[22] Filed: Mar. 5, 1997

[51] Int. Cl.[6] .............................. A47B 67/02; G08B 1/00; G06F 1/14

[52] U.S. Cl. ............... 702/177; 364/479.11; 364/479.12; 364/479.14; 221/2; 221/3; 221/15; 368/10; 340/309.15

[58] Field of Search .............................. 364/569, 479.06, 364/479.14, 479.11, 479.12; 368/10, 109; 221/2, 3, 7, 211, 15; 340/309.04, 309.15; 702/177

[56] References Cited

U.S. PATENT DOCUMENTS

| | | | |
|---|---|---|---|
| 4,504,153 | 3/1985 | Schollmeyer et al. | 364/569 |
| 4,695,954 | 9/1987 | Rose et al. | 364/479.06 |
| 4,725,997 | 2/1988 | Urquhart et al. | 368/10 |
| 4,951,596 | 8/1990 | Wallace, Jr. | 116/321 |
| 5,011,032 | 4/1991 | Rollman | 221/4 |
| 5,088,056 | 2/1992 | McIntosh et al. | 364/569 |
| 5,405,048 | 4/1995 | Rogers et al. | 221/211 |
| 5,408,443 | 4/1995 | Weinberger | 368/10 |

*Primary Examiner*—John E. Barlow, Jr.
*Assistant Examiner*—Bryan Bui

[57] ABSTRACT

A new Programmable Medicine Dispenser and Storage Device for allowing for user or physician programming of a medication administration schedule, alerting the user, by means of an audible alarm, of a scheduled medication administration time, opening a corresponding medication compartment upon user acknowledgment of the alarm and instructing the user on the proper method of taking the medication. The inventive device includes a real time clock for generating real time signals, a keypad for setting each medication administration time, an acknowledgment key for generating an acknowledgment signal, a programmable controller for activating the alarm in response to the medication administration schedule when each medication administration time is the same as the real time signal and for processing the acknowledgment signal, and at least one medication compartment having a lower compartment and a lid hingedly and latchedly attached thereto, each medication compartment further having an unlatching mechanism for unlatching the lid from the lower compartment when each medication administration time corresponds to the real time signal and in response to the acknowledgment signal, the unlatching mechanism being connected to the programmable controller.

13 Claims, 4 Drawing Sheets

FIG. 1
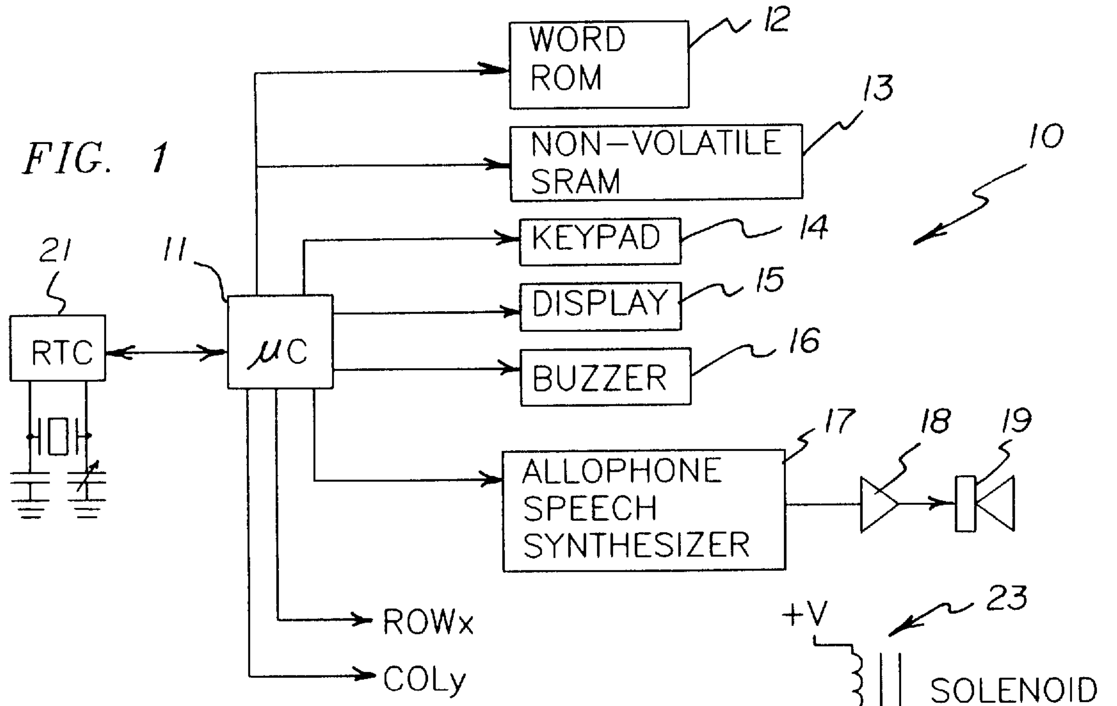
FIG. 2
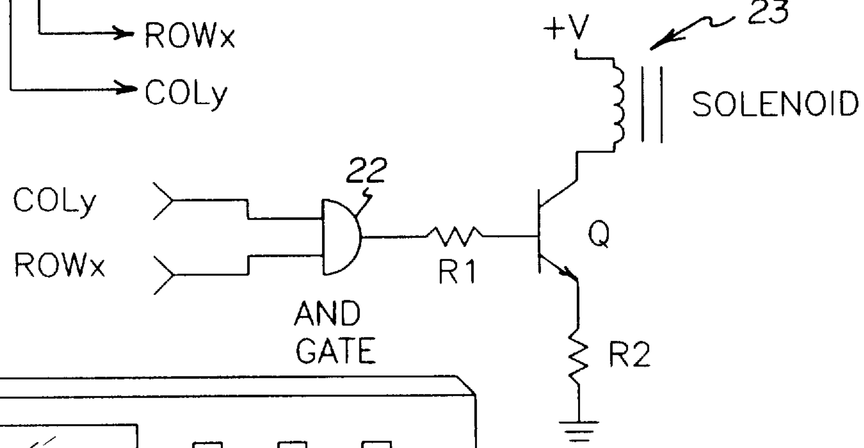
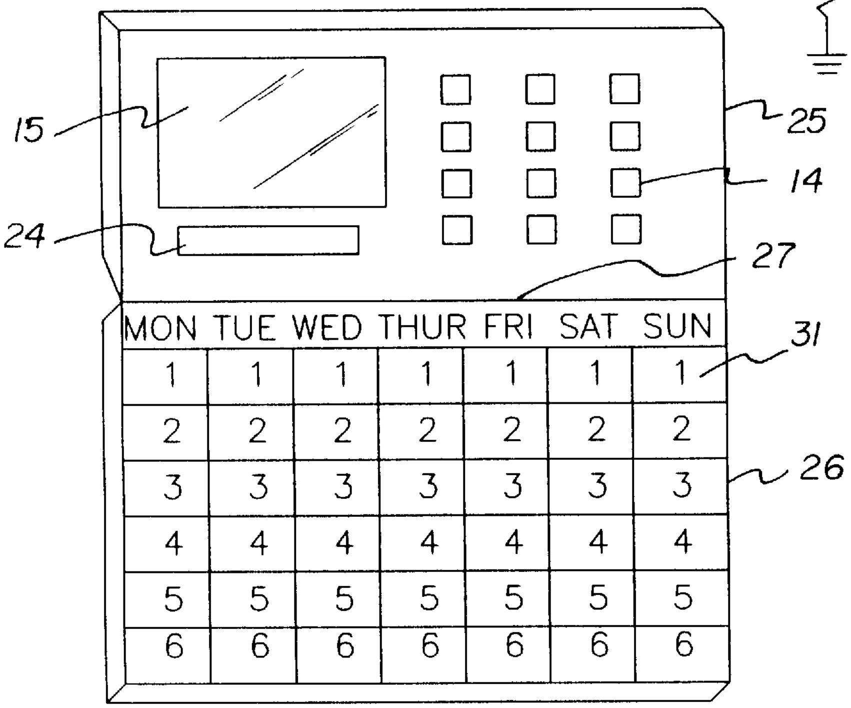
FIG. 3

PROGRAMMABLE MEDICINE DISPENSER AND STORAGE DEVICE

BACKGROUND OF THE INVENTION

1. Field of the Invention

The present invention relates to electronic alarm devices which indicate when medication should be taken and more particularly pertains to a new Programmable Medicine Dispenser and Storage Device which allows for user or physician programming of a medication administration schedule, alerts the user, by means of an audible alarm, of a scheduled medication administration time, opens a corresponding medication compartment upon user acknowledgment of the alarm and instructs the user on the proper method of taking the medication.

2. Description of the Prior Art

The use of electronic alarm devices which indicate when medication should be taken is known in the prior art. More specifically, electronic alarm devices which indicate when medication should be taken heretofore devised and utilized are known to consist basically of familiar, expected and obvious structural configurations, notwithstanding the myriad of designs encompassed by the crowded prior art which have been developed for the fulfillment of countless objectives and requirements.

Known prior art electronic alarm devices which indicate when medication should be taken include U.S. Pat. No. 4,725,999; U.S. Pat. No. 4,768,177; U.S. Pat. No. Des. 291,120; U.S. Pat. No. Des. 279,551; U.S. Pat. No. 5,289, 157 and U.S. Pat. No. 5,239,491.

While these devices fulfill their respective, particular objectives and requirements, the aforementioned patents do not disclose a new Programmable Medicine Dispenser and Storage Device. The inventive device includes a clock means for generating real time signals, a data entry means for setting each medication administration time, an acknowledgment means for generating an acknowledgment signal, a programmable controller and memory means for activating the alarm means in response to the medication administration schedule when each medication administration time is the same as the real time signal and for processing the acknowledgment signal and at least one medication compartment having a lower compartment and a lid hingedly and latchedly attached thereto, each medication compartment further having a means for unlatching the lid from the lower compartment when each medication administration time corresponds to the real time signal and in response to the acknowledgment signal, the means for unlatching the lid from the lower compartment being operably coupled to the programmable controller and memory means.

In these respects, the Programmable Medicine Dispenser and Storage Device according to the present invention substantially departs from the conventional concepts and designs of the prior art, and in so doing provides an apparatus primarily developed for the purpose of allowing for user or physician programming of a medication administration schedule, alerting the user, by means of an audible alarm, of a scheduled medication administration time, opening a corresponding medication compartment upon user acknowledgment of the alarm and instructing the user on the proper method of taking the medication.

SUMMARY OF THE INVENTION

In view of the foregoing disadvantages inherent in the known types of electronic alarm devices which indicate when medication should be taken now present in the prior art, the present invention provides a new Programmable Medicine Dispenser and Storage Device construction wherein the same can be utilized for allowing for user or physician programming of a medication administration schedule, alerting the user, by means of an audible alarm, of a scheduled medication administration time, opening a corresponding medication compartment upon user acknowledgment of the alarm and instructing the user on the proper method of taking the medication.

The general purpose of the present invention, which will be described subsequently in greater detail, is to provide a new Programmable Medicine Dispenser and Storage Device apparatus and method which has many of the advantages of the electronic alarm devices which indicate when medication should be taken mentioned heretofore and many novel features that result in a new Programmable Medicine Dispenser and Storage Device which is not anticipated, rendered obvious, suggested, or even implied by any of the prior art electronic alarm devices which indicate when medication should be taken, either alone or in any combination thereof.

To attain this, the present invention generally comprises a clock means for generating real time signals, a data entry means for setting each medication administration time, an acknowledgment means for generating an acknowledgment signal, a programmable controller and memory means for activating the alarm means in response to the medication administration schedule when each medication administration time is the same as the real time signal and for processing the acknowledgment signal and at least one medication compartment having a lower compartment and a lid hingedly and latchedly attached thereto, each medication compartment further having a means for unlatching the lid from the lower compartment when each medication administration time corresponds to the real time signal and in response to the acknowledgment signal, the means for unlatching the lid from the lower compartment being operably coupled to the programmable controller and memory means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Programmable Medicine Dispenser and Storage Device apparatus and method which has many of the advantages of the electronic alarm devices which indicate when medication should be taken mentioned heretofore and many novel features that result in a new Programmable Medicine Dispenser and Storage Device which is not anticipated, rendered obvious, suggested, or even implied by any of the prior art electronic alarm devices which indicate when medication should be taken, either alone or in any combination thereof.

It is another object of the present invention to provide a new Programmable Medicine Dispenser and Storage Device which may be easily and efficiently manufactured and marketed.

It is a further object of the present invention to provide a new Programmable Medicine Dispenser and Storage Device which is of a durable and reliable construction.

An even further object of the present invention is to provide a new Programmable Medicine Dispenser and Storage Device which is susceptible of a low cost of manufacture with regard to both materials and labor, and which accordingly is then susceptible of low prices of sale to the consuming public, thereby making such Programmable Medicine Dispenser and Storage Device economically available to the buying public.

Still yet another object of the present invention is to provide a new Programmable Medicine Dispenser and Storage Device which provides in the apparatuses and methods of the prior art some of the advantages thereof, while simultaneously overcoming some of the disadvantages normally associated therewith.

Still another object of the present invention is to provide a new Programmable Medicine Dispenser and Storage Device for allowing for user or physician programming of a medication administration schedule, alerting the user, by means of an audible alarm, of a scheduled medication administration time, opening a corresponding medication compartment upon user acknowledgment of the alarm and instructing the user on the proper method of taking the medication.

Yet another object of the present invention is to provide a new Programmable Medicine Dispenser and Storage Device which includes a clock means for generating real time signals, a data entry means for setting each medication administration time, an acknowledgment means for generating an acknowledgment signal, a programmable controller and memory means for activating the alarm means in response to the medication administration schedule when each medication administration time is the same as the real time signal and for processing the acknowledgment signal and at least one medication compartment having a lower compartment and a lid hingedly and latchedly attached thereto, each medication compartment further having a means for unlatching the lid from the lower compartment when each medication administration time corresponds to the real time signal and in response to the acknowledgment signal, the means for unlatching the lid from the lower compartment being operably coupled to the programmable controller and memory means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic diagram of the Programmable Medicine Dispenser and Storage Device according to the present invention.

FIG. 2 is a circuit diagram showing the solenoid powering circuit thereof.

FIG. 3 is a perspective view of the present invention.

DESCRIPTION OF THE PREFERRED EMBODIMENT

Figure 4:
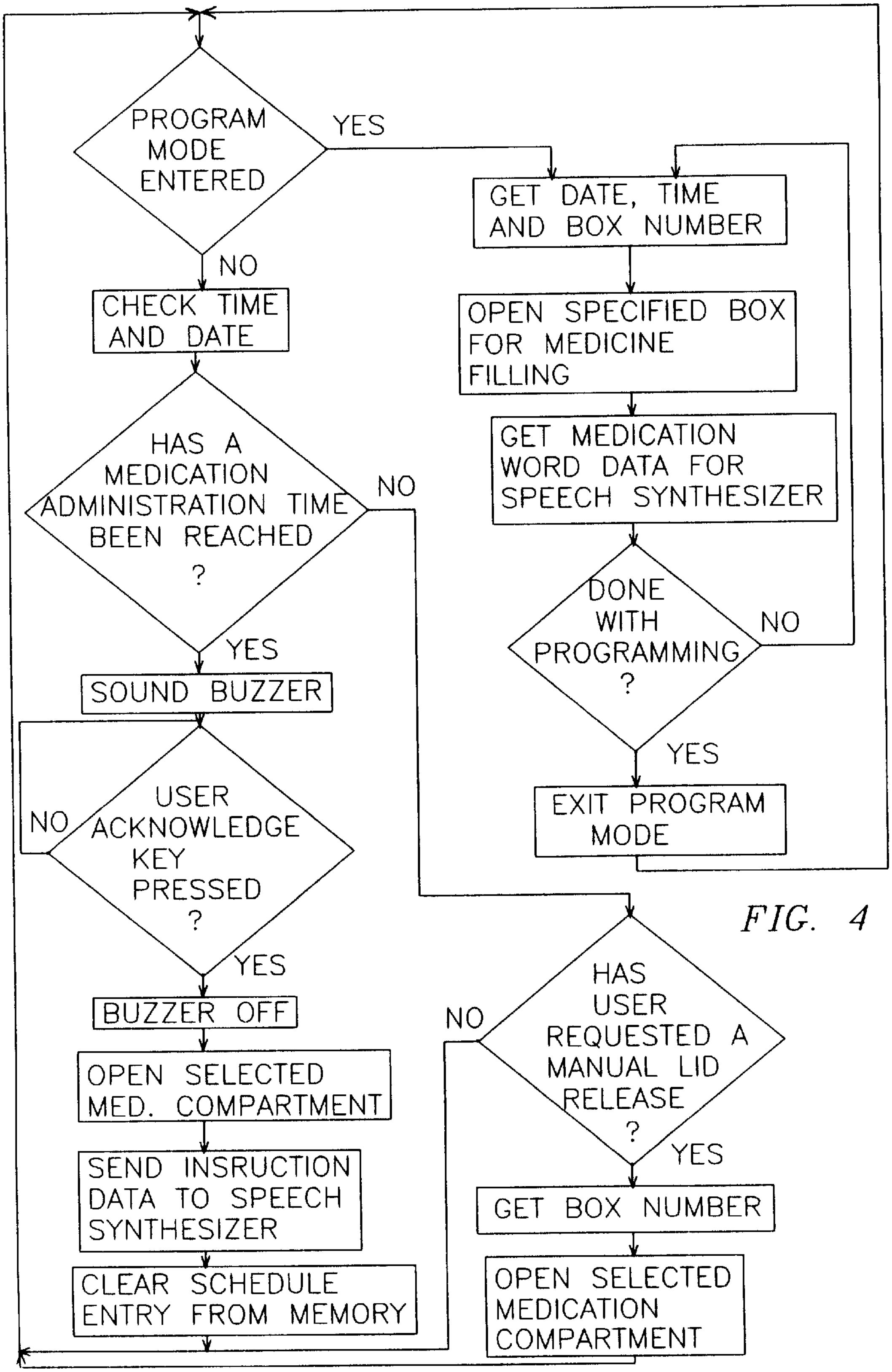
FIG. 4 is a flow diagram illustrating the programming of the microcontroller of the invention.

With reference now to the drawings, and in particular to FIGS. 1 through 8 thereof, a new Programmable Medicine Dispenser and Storage Device embodying the principles and concepts of the present invention and generally designated by the reference numeral 10 will be described.

More specifically, it will be noted that the Programmable Medicine Dispenser and Storage Device 10 comprises a clock means for generating real time signals such as an adjustable real time clock 21, a data entry means for setting each medication administration time such as keypad 14, an alarm means for alerting the user of each medication administration time such as buzzer 16, an acknowledgment means for generating an acknowledgment signal such as acknowledgment key 24, a programmable controller and memory means for activating the alarm means in response to the medication administration schedule when each medication administration time is the same as the real time signal and for processing the acknowledgment signal such as microcontroller 11, and at least one medication compartment 31 having a lower compartment 34 and a lid 32 hingedly and latchedly attached thereto.

With reference to FIG. 1 microcontroller 11 is shown operably connected to a read only memory means such as a Word ROM 12 which contains a finite set of data representing common medication names and phrases. Also shown is a programmable non-volatile static random access memory means such as device 13 operably coupled to the microcontroller 11. The programmable non-volatile static random access memory device 13 is programmable by means of a data entry means such as keypad 14 and stores data not included in the Word ROM 12.

With continued reference to FIG. 1 a clock means such as an adjustable real time clock 21 is shown operably coupled to the microcontroller 11. The real time clock 21 provides a real time signal to the microcontroller 11 which further includes processing means for processing the real time signal into a real time which is displayed by display means such an LCD device 15.

An alarm means such as buzzer 16 is also shown in FIG. 1 operably coupled to the microcontroller 11. In addition a speech synthesizer means such as an allophone speech synthesizer 17 such as a General Instruments SP0256-AL2 is shown operably coupled to the microcontroller. The microcontroller 11 includes means for generating an instruction phrase signal based upon a user or physician programmed instruction phrase which corresponds to the medication administration schedule. A low power amplifier 18 is shown coupled to the allophone speech synthesizer 17 for providing an audio signal to a loudspeaker 19.

With reference to FIG. 2 row and column outputs from the microcontroller 11 are coupled to row and column inputs of an AND gate 22. When both inputs are high, a voltage is applied to the base of a transistor Q through resistor R1, turning on Q. A current through the collector of Q energizes the coil of solenoid 23 which operates an unlatching mechanism as more fully described hereinafter.

With reference to FIG. 3 there is shown an upper housing 25 for containing the microcontroller 11, the Word ROM 12, the programmable non-volatile static random access memory 13, the keypad 14, the LCD 15, the buzzer 16, the allophone speech synthesizer 17, the low power amplifier 18 and the loudspeaker 19. Also shown is an acknowledgment key 24 for user input to the microcontroller 11, the use of which will be detailed hereinafter.

With continued reference to FIG. 3 a lower housing 26 is shown including a plurality of medication compartments 31. Each column corresponding to one day of the week includes six medication compartments 31 for storage of six discrete quantities of medication. The lower housing 26 is hingedly attached to the upper housing at hinged connection 27.

With reference to FIG. 4 the programming of the microcontroller 11 is shown. The keypad 14 includes a program mode key (not shown) for entering the medication administration schedule and the instruction phrase. Upon entering the program mode, a medication administration time is entered which includes a date and a time. Additionally, a box number is entered which corresponds to one of the six medication compartments for the date entered. The selected medication compartment is then opened so that the medication can be placed therein. If an instruction phrase is needed at the medication administration time it is entered by means of keys on the keypad 14 (not shown). This procedure is repeated until the medication administration schedule is complete and the program mode is exited.

With continued reference to FIG. 4 the user may request a manual lid release at any time before the medication administration time. A box number is entered by the user and the microcontroller 11 sets the corresponding medication compartment inputs high thereby activating the unlatching mechanism.

Upon the correspondence of a medication administration time with the real time signal, the buzzer 16 is sounded. Upon the user's acknowledgment, which is obtained by the user depressing the acknowledgment key 24, the buzzer 16 is turned off and the medication compartment which corresponds to the medication administration time is unlatched and the instruction phrase signal is sent to the allophone speech synthesizer 17. The medication administration time is then cleared from the microcontroller memory and the procedure is repeated for each medication administration time.

Figure 5:
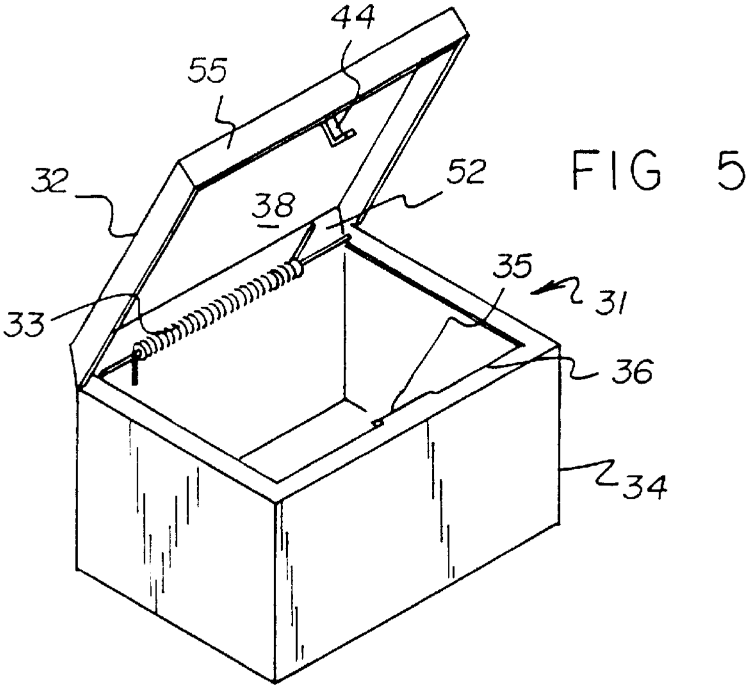
FIG. 5 is a perspective view of a medication compartment of the present invention.

With reference to FIG. 5 there is shown a medication compartment 31 including a lower compartment 34 having a lid 32 hingedly attached thereto. A spring 33 is shown fixedly attached to a lower compartment back wall 28 and to an angled interior lid surface 52 which corresponds to an exterior angled lid portion 51. The spring 33 biases the lid 32 in a open position relative to the lower compartment 34. The lid 32 further includes a front edge 55 having an interior lid front edge 37. The lower compartment 34 further includes a rim 36 having a catch 35 integrally formed thereon.

Figure 6:
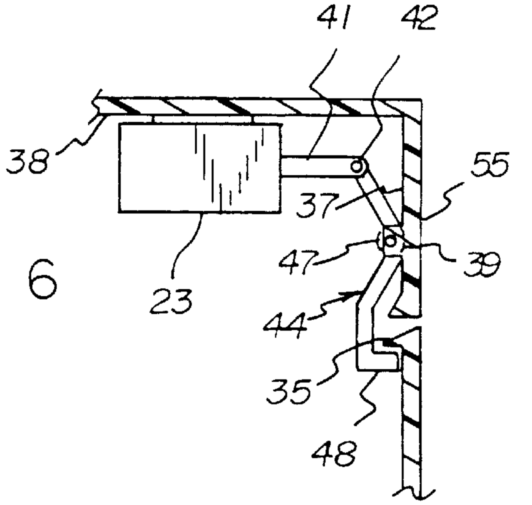
FIG. 6 is a fragmented view of the latching mechanism of the invention showing the latching member engaged to the catch.
Figure 7:
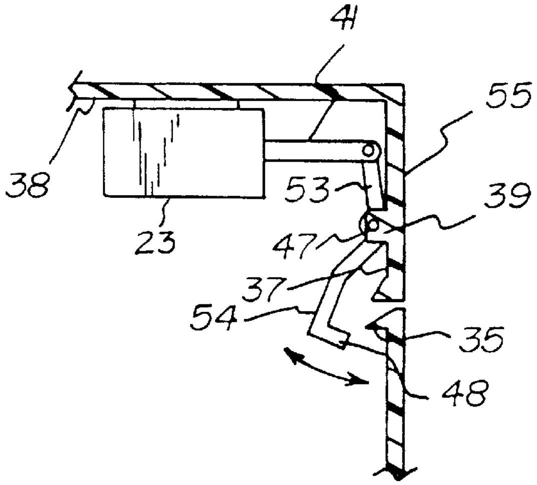

With reference to FIGS. 6 and 7 an unlatching mechanism includes a latching member 44 having a first section 53, a second section 54 and a pivot point 47. The first section 53 and the second section 54 form an obtuse angle at the pivot point 47. A solenoid 23 is shown fixedly attached to an interior lid surface 38 and a shaft 41 serves as a solenoid core. The shaft 41 is connected at a shaft end 42 to the latching member first section 53. The pivot point 47 is pivotally connected to a bracket 39 integrally formed on the interior lid front edge 37. Disposed at the end of the second section 54 is an engaging portion 48 for engaging the catch 35.

Figure 8:
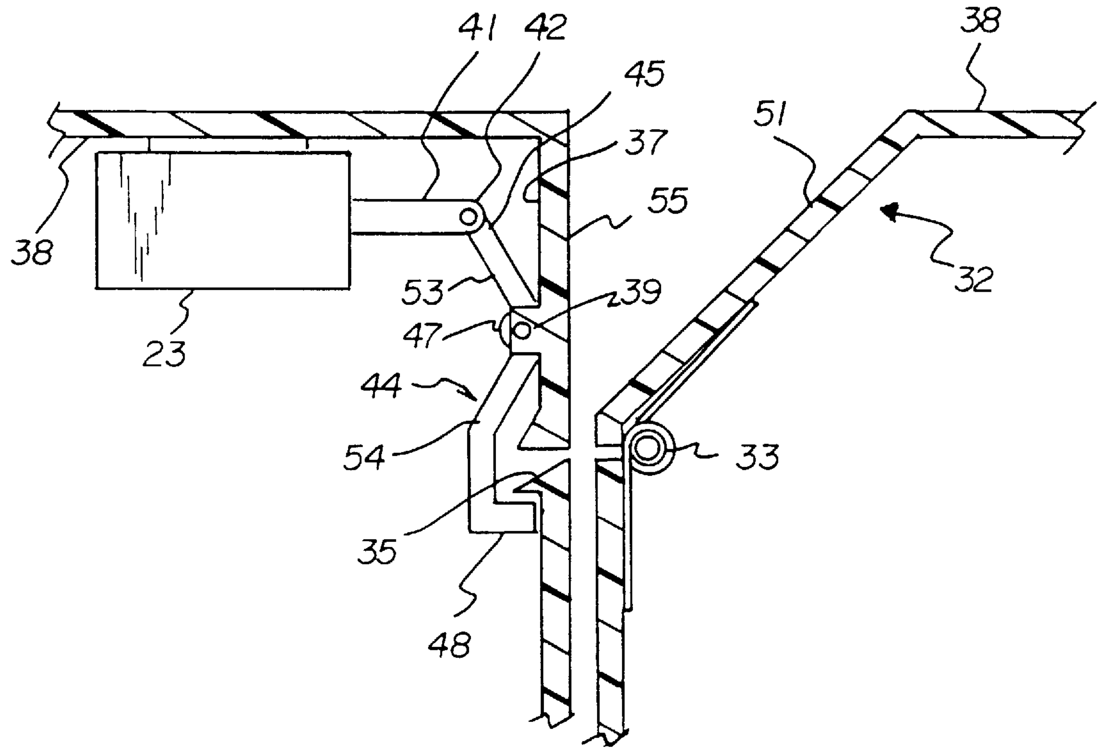

In use, the solenoid corresponding to a medication compartment is activated whereupon the solenoid core 41 acts to pivot the latching member 44 about the pivot point 47 thereby disengaging engaging portion 48 from the catch 35. The spring 33 causes the lid 32 to open enabling the user to withdraw the contents of the medication compartment. To close the medication compartment the user simply pushes the lid to re-engage the engaging portion 48 to the catch 35. FIG. 8 shows two medication compartments disposed adjacent to one another. The exterior angled lid portion 51 is formed to allow the lid 32 of the adjacent medication compartment to open and close.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A programmable medicine dispenser and storage device for alerting a user of a medication administration schedule including at least one medication administration time comprising:

a clock means for generating real time signals;

a data entry means for setting each medication administration time;

an alarm means for alerting the user of each medication administration time;

an acknowledgment means for generating an acknowledgment signal;

a programmable controller and memory means for activating the alarm means in response to the medication administration schedule when each medication administration time is the same as the real time signal and for processing the acknowledgment signal;

at least one medication compartment comprising a lower compartment and a lid hingedly and latchedly attached thereto, each medication compartment further comprising a means for unlatching the lid from the lower compartment when each medication administration time corresponds to the real time signal and in response to the acknowledgment signal, the means for unlatching the lid from the lower compartment being operably coupled to the programmable controller and memory means; and wherein the means for unlatching the lid from the lower compartment further comprise a biasing spring fixedly attached to an angled interior lid surface corresponding to an exterior angled lid portion and a lower compartment back wall for holding the lid in an open position, a solenoid fixedly attached to an interior lid surface, a latching member having a first section, a second section and a pivot point disposed therebetween, and a shaft pivotally attached to the latching member first section, the shaft further comprising a solenoid core, the latching member being pivotally mounted to a bracket integrally formed on an interior lid front edge at the pivot point, the latching member further comprising an engaging portion formed at an end of the latching member second section, the latching member being pivotable about the pivot point between a first position in which the solenoid is not activated and the engaging portion engages a catch integrally formed on a front lower compartment rim and a second position in which the solenoid is activated and the engaging portion disengages the catch.

2. The programmable medicine dispenser and storage device of claim 1, wherein the alarm means further comprise an audible alarm.

3. The programmable medicine dispenser and storage device of claim 1, wherein the data entry means further comprise a keypad operably coupled to the programmable controller and memory means for entering the medication administration schedule and the instruction phrase into the programmable controller and memory means.

4. The programmable medicine dispenser and storage device of claim 1, wherein the programmable controller and memory means further comprise processing means for generating a real time.

5. The programmable medicine dispenser and storage device of claim 4, further comprising a display means for displaying the real time, the instruction phrase and the medication administration schedule.

6. The programmable medicine dispenser and storage device of claim 1, wherein the medication compartments are arrayed in a lower housing and the clock means, the data entry means, the alarm means, the acknowledgment means and the programmable controller and memory means are housed in an upper housing, the lower housing and the upper housing being hingedly attached at a hinged connection.

7. A programmable medicine dispenser and storage device for alerting a user of a medication administration schedule including at least one medication administration time comprising:

a clock means for generating real time signals;

a data entry means for setting each medication administration time;

an alarm means for alerting the user of each medication administration time;

an acknowledgment means for generating an acknowledgment signal;

a programmable controller and memory means for activating the alarm means in response to the medication administration schedule when each medication administration time is the same as the real time signal and for processing the acknowledgment signal;

at least one medication compartment comprising a lower compartment and a lid hingedly and latchedly attached thereto, each medication compartment further comprising a means for unlatching the lid from the lower compartment when each medication administration time corresponds to the real time signal and in response to the acknowledgment signal, the means for unlatching the lid from the lower compartment being operably coupled to the programmable controller and memory means; and a read only memory means containing a finite set of data representing common medication names and phrases operably coupled to the programmable controller and memory means, a programmable non-volatile static random access memory means operably coupled to the programmable controller and memory means for storage of data not included in the read only memory means, the programmable controller and memory means further comprising processing means for generating an instruction phrase signal in response to an instruction phrase corresponding to the medication administration schedule, and a speech synthesizer means operably coupled to the programmable controller and memory means responsive to the instruction phrase signal.

8. The programmable medicine dispenser and storage device of claim 7, wherein the speech synthesizer means further comprise an allophone speech synthesizer coupled to a low power amplifier for providing an audio signal to a loudspeaker.

9. The programmable medicine dispenser and storage device of claim 7, wherein the alarm means further comprise an audible alarm.

10. The programmable medicine dispenser and storage device of claim 7, wherein the data entry means further comprise a keypad operably coupled to the programmable controller and memory means for entering the medication administration schedule and the instruction phrase into the programmable controller and memory means.

11. The programmable medicine dispenser and storage device of claim 7, wherein the programmable controller and memory means further comprise processing means for generating a real time.

12. The programmable medicine dispenser and storage device of claim 11, further comprising a display means for displaying the real time, the instruction phrase and the medication administration schedule.

13. A programmable medicine dispenser and storage device for alerting a user of a medication administration schedule including at least one medication administration time comprising:

a clock means for generating real time signals;

a data entry means for setting each medication administration time;

an alarm means for alerting the user of each medication administration time;

an acknowledgment means for generating an acknowledgment signal;

a programmable controller and memory means for activating the alarm means in response to the medication administration schedule when each medication administration time is the same as the real time signal and for processing the acknowledgment signal;

at least one medication compartment comprising a lower compartment and a lid hingedly and latchedly attached thereto, each medication compartment further comprising a means for unlatching the lid from the lower compartment when each medication administration time corresponds to the real time signal and in response to the acknowledgment signal, the means for unlatching the lid from the lower compartment being operably coupled to the programmable controller and memory means;

wherein the means for unlatching the lid from the lower compartment further comprise a biasing spring fixedly attached to an angled interior lid surface corresponding to an exterior angled lid portion and a lower compartment back wall for holding the lid in an open position, a solenoid fixedly attached to an interior lid surface, a latching member having a first section, a second section and a pivot point disposed therebetween, and a shaft pivotally attached to the latching member first section, the shaft further comprising a solenoid core, the latching member being pivotally mounted to a bracket integrally formed on an interior lid front edge at the pivot point, the latching member further comprising an engaging portion formed at an end of the latching member second section, the latching member being pivotable about the pivot point between a first position in which the solenoid is not activated and the engaging portion engages a catch integrally formed on a front lower compartment rim and a second position in which the solenoid is activated and the engaging portion disengages the catch;

wherein the alarm means further comprise an audible alarm;

a read only memory means containing a finite set of data representing common medication names and phrases operably coupled to the programmable controller and memory means, a programmable non-volatile static random access memory means operably coupled to the programmable controller and memory means for storage of data not included in the read only memory means, the programmable controller and memory means further comprising processing means for generating an instruction phrase signal in response to an instruction phrase corresponding to the medication administration schedule, and a speech synthesizer means operably coupled to the programmable controller and memory means responsive to the instruction phrase signal;

wherein the speech synthesizer means further comprise an allophone speech synthesizer coupled to a low power amplifier for providing an audio signal to a loudspeaker;

wherein the data entry means further comprise a keypad operably coupled to the programmable controller and memory means for entering the medication administration schedule and the instruction phrase into the programmable controller and memory means;

wherein the programmable controller and memory means further comprise processing means for generating a real time;

a display means for displaying the real time, the instruction phrase and the medication administration schedule; and wherein the medication compartments are arrayed in a lower housing and the clock means, the data entry means, the alarm means, the acknowledgment means and the programmable controller and memory means are housed in an upper housing, the lower housing and the upper housing being hingedly attached at a hinged connection.

* * * * *